Figure 1:
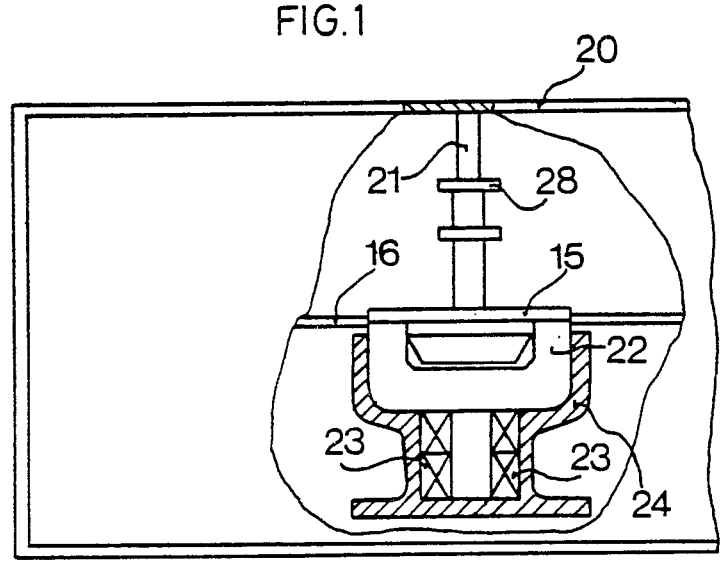

United States Patent [19]

Hack et al.

[11] 4,430,678
[45] Feb. 7, 1984

[54] DRIVE APPARATUS FOR RECORDING DISKS IN WHICH THE DISK IS CLAMPED BETWEEN A DRIVEN RECESSED MEMBER AND A ROTATABLY MOUNTED CLAMPING MEMBER

[75] Inventors: Joachim Hack, Ludwigshafen; Roland Brotzler, Hochdorf-Assenheim; Klaus Schulze-Berge, Ludwigshafen; Rudolf Angermann, Offenburg, all of Fed. Rep. of Germany

[73] Assignee: BASF Aktiengesellschaft, Ludwigshafen, Fed. Rep. of Germany

[21] Appl. No.: 259,654

[22] Filed: May 1, 1981

[30] Foreign Application Priority Data

May 30, 1980 [DE] Fed. Rep. of Germany ....... 3020525

[51] Int. Cl.³ .............................................. G11B 25/04
[52] U.S. Cl. ......................................... 360/99; 360/97
[58] Field of Search .................................. 360/97–99, 360/105, 106, 137, 133, 135

[56] References Cited

U.S. PATENT DOCUMENTS 3,898,814  8/1975  Chou et al. ...................... 360/99 X
4,171,531 10/1979  Grapes et al. ......................... 360/97

FOREIGN PATENT DOCUMENTS 2524316  8/1976  Fed. Rep. of Germany .

OTHER PUBLICATIONS

IBM/TDB, vol. 19, No. 6, Nov. 1976, pp. 2202–2203, "Collet Mechanism for Centering . . . ", by Lightner.

Primary Examiner—John H. Wolff
Attorney, Agent, or Firm—Keil & Witherspoon

[57] ABSTRACT

A drive apparatus for a recording disk, particularly a flexible magnetic disk in an envelope, comprising a rotatable clamping member which can be caused to engage one another, after the recording disk has been introduced therebetween, to clamp the disk for rotation thereof, in position between clamping surfaces of the two members. The clamping member is of axially expandable design and a resilient element is interposed between the face of the clamping member and the bottom of the recessed member so that the clamping member, prior to completion of its stroke and prior to its radial expansion, is engaged by the spring element. In this manner the spring element centers the position of the clamping member with respect to the recessed member and thereby insures clamping of the disk in its centered position.

5 Claims, 7 Drawing Figures

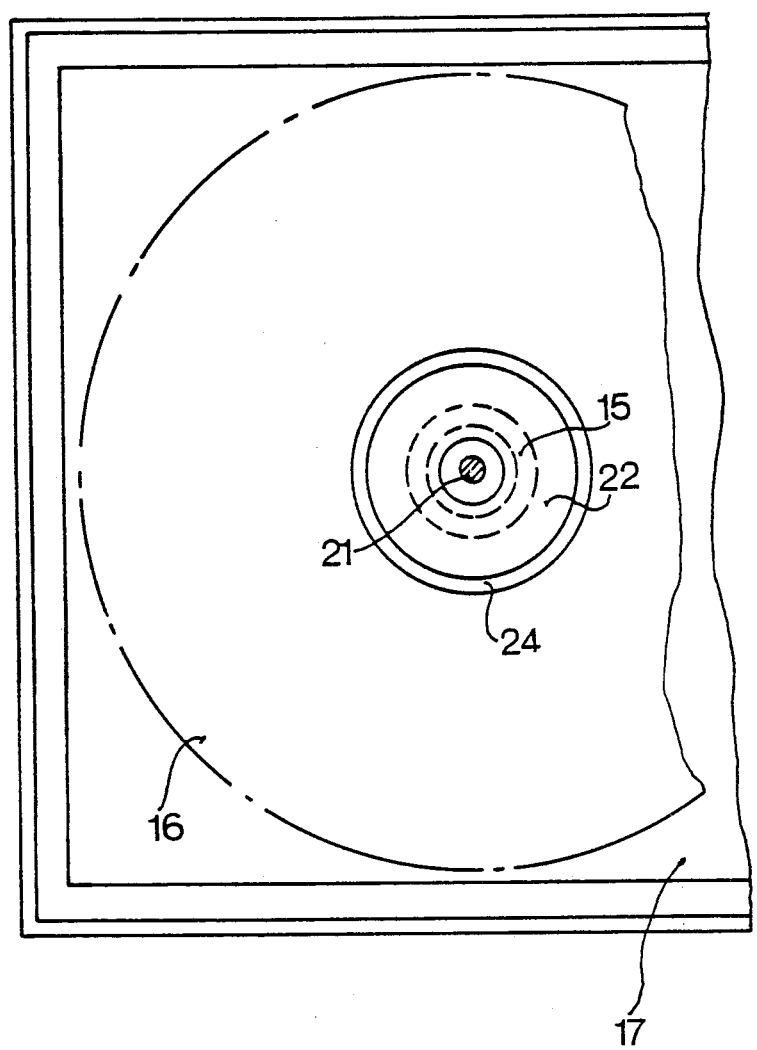

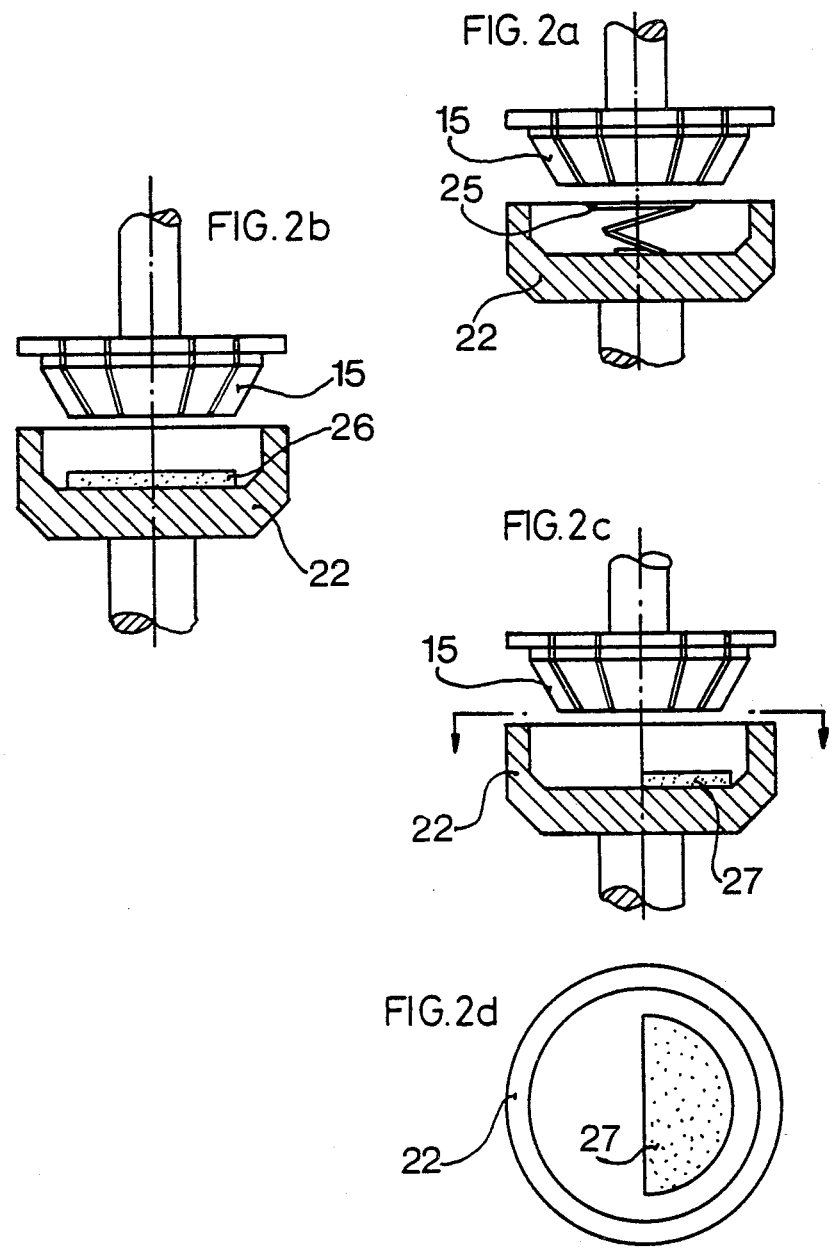

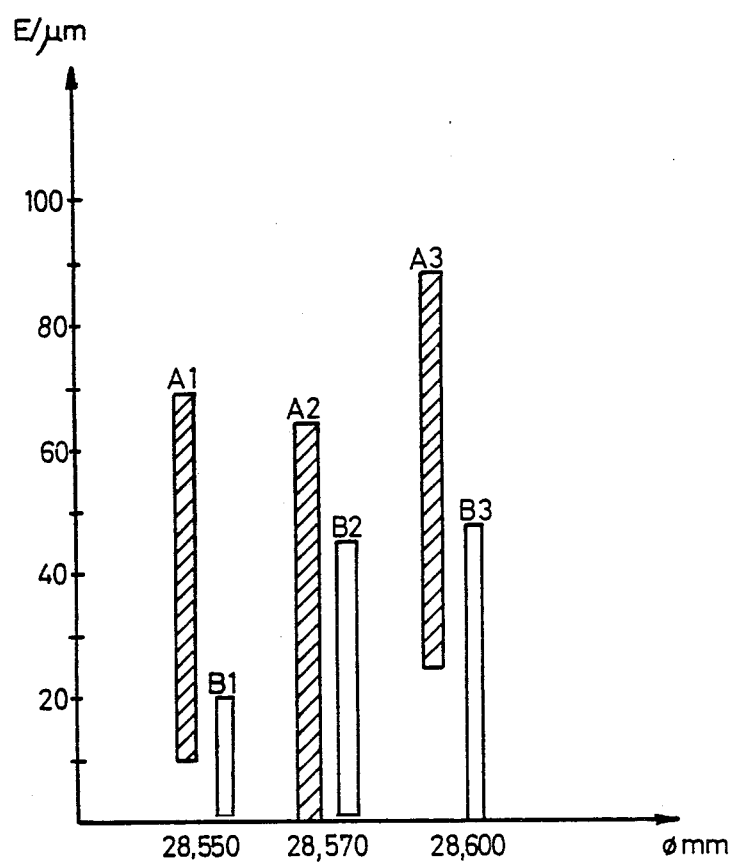

DRIVE APPARATUS FOR RECORDING DISKS IN WHICH THE DISK IS CLAMPED BETWEEN A DRIVEN RECESSED MEMBER AND A ROTATABLY MOUNTED CLAMPING MEMBER

The present invention relates to a drive apparatus for a recording disk, particularly a flexible magnetic disk in an envelope, comprising driving means for the recording disk, which consist essentially of a rotatable clamping member and a driven recessed member, the recording disk, after having been introduced between the clamping member and the recessed member, being clamped in the ideal position for rotation by causing the said two members to engage.

Drive apparatus for flexible magnetic disks, also called floppy disks or Flexydisks (registered trademark of BASF Aktiengesellschaft, 6700 Ludwigshafen, Germany), have already been disclosed, for example in U.S. Pat. No. 3,940,793 in which the clamping member is connected to an arm and can be caused to engage the driven recessed member bearing the magnetic disk by pivoting the arm.

In the operation of such disk drives under field conditions it has been found that recorded signals are modulated when they are played back.

It is an object of the present invention to overcome this by improving centering of the disk without any additional manipulation by the operator.

We have found that this object is achieved with a drive apparatus of the initially described type, wherein a spring element is arranged between the clamping member and the recessed member, which spring element non-positively connects the recessed member to the clamping member before the recording disk is clamped in the ideal position.

The novel spring element causes radial expansion of the clamping member and/or early rotation of the clamping member by the recessed member, as a result of which the recording disk is automatically centered.

In a practical embodiment of the invention, the spring element is a metal spring, preferably a leaf spring, which primarily effects radial expansion of the clamping member.

In an advantageous embodiment, the spring element is made from a resilient plastics material, particularly a foam plastic; this variant is very economical and can be subsequently fitted without difficulty.

In a further embodiment of the invention, the spring element is arranged eccentrically with respect to the axis of rotation of the clamping and recessed members, a self-centering action thus being achieved.

In another advantageous embodiment, the spring element has a spring rate of from 0.2 N/mm to 1.0 N/mm, preferably about 0.4 N/mm. The point in time at which the clamping member is caused to rotate and hence the point in time at which the recording disk is caused to rotate and is consequently centered before being clamped in the ideal position can thus be reproducibly determined.

A particular advantage of the present invention is that even in the case of disk drives with a poor centering action the number of read errors can be greatly reduced, and that disks with an eccentric central hole can be operated almost error-free.

Further details of the disk drive according to the invention are disclosed below with reference to the embodiments illustrated in the accompanying drawings, in which FIG. 1 is a diagrammatic side view of the novel disk drive apparatus, partially broken away to reveal the arrangement of the clamping and recessed members, FIG. 1a is a diagrammatic plan view of the drive apparatus of FIG. 1, showing a flexible magnetic disk and jacket in part, FIGS. 2a to 2c are diagrammatic side views, partly in cross-section, of the clamping and recessed members, showing variants of the spring element, FIG. 2d is a diagrammatic plan view of the recessed member of FIG. 2c, and FIG. 3 is a diagram showing the eccentricity of the center of the recording disk in dependence on various diameters of the central hole in the disk.

FIG. 1 shows a housing 20 of a drive apparatus for a flexible magnetic disk 16 in a stiffer rectangular envelope 17. The cartridge comprising the magnetic disk 16 and the envelope 17 is introduced into the drive apparatus through an entrance slot (not shown). The drive apparatus further comprises a rotatably mounted clamping member 15 which serves to clamp and rotate the magnetic disk 16. The clamping member 15 cooperates with a recessed hub 22 which can be rotated by a drive motor (not shown) and whose housing 24 is fastened to the bottom of the housing 20. Bearings 23 are provided between housing 24 and the shaft carrying recessed hub 22. The clamping member is rotatable about a guide sleeve 28 which can be displaced, by means of a lever (not shown), on a shaft 21 fastened to the top of the housing 20. Clamping member 15 is shown in its operative position, i.e. in engagement with recessed hub 22, in FIG. 1. To introduce the cartridge with magnetic disk 16 into the drive apparatus, clamping member 15 is disengaged from recessed hub 22 via sleeve 28, so that the cartridge can pass therebetween. After the cartridge has been inserted, clamping member 15 and recessed hub 22 are brought into engagement with one another, as a result of which magnetic disk 16 is clamped between clamping member 15 and hub 22 and is thus rotated.

As a result of the manufacturing tolerances of the clamping means of the disk drive and/or of the central hole in the disk and/or in view of incorrect insertion of the disk, the disk 16 does not rotate evenly, which results in modulation of the recorded signals when they are played back. Variants of the novel spring element for remedying this, together with the clamping and recesses members, are illustrated in FIGS. 2. FIG. 2a shows a coil spring which has the shape of an inverted truncated cone and is fastened to recessed hub 22. A helical spring can of course also be employed, or, preferably, a leaf spring of any shape because it takes up less room. FIG. 2b shows a disk-shaped spring element made from a resilient plastics material, preferably a foam plastic, e.g. a polyurethane or PVC foam or another rubber-like foam. The thickness of the spring element is selected in accordance with the requisite spring rate and the desired frictional force because the position of members 15 and 22 relative to one another and hence the maximum spring travel is predetermined. However, it is essential that contact between clamping member 15 and recessed hub 22 via spring element 25 or 26 should be made over the travel of the clamping member up to its end position, as a result of which clamping member 15 is either radially expanded and thus holds disk 16 and/or clamping member 15 is rotated before disk 16 is clamped in the ideal position. Rotation of recessed hub 22 should therefore be commenced at an appropriate time beforehand.

When clamping member 15 is caused to rotate, disk 16 is centered relative to the drive apparatus, i.e. is correctly positioned relative to the write/read head (not shown), owing to the motion of the clamping member with respect to the just stationary disk 16, so that, when the recorded signals are played back, modulation is substantially avoided.

FIGS. 2c and 2d show an eccentric arrangement of a plastic foam spring element 27, which has a stronger centering action. Although the spring element in this instance is semicircular, it can of course be of any other shape. In the embodiment shown here, spring element 27 is adhered to the bottom of the recess in hub 22. It is naturally also possible to use a metal spring instead of the plastic foam element 27. In principle, the spring element can also be fastened to clamping member 15 or a spring element can be fastened to each of the members 15 and 22, the two spring elements being brought together in the described manner to effect radial expansion of clamping member 15 and/or rotation of disk 16.

A disk drive with and without a spring element was tested under conditions encountered in the field. A spring element 27 of polyurethane foam having a thickness of about 3 mm and a spring rate of about 40 g/mm, corresponding to about 0.4 N/mm, was used in the comparative tests which were conducted with ®Flexydisks whose central holes had three different diameters. With reference to FIG. 3, 1 denotes in each case the lower tolerance limit, 2 the nominal diameter, and 3 the upper tolerance limit. The eccentric deviations of the center of the disk from the ideal center thereof were determined in each case in 30 clamping tests. The letter A designates in each case the tests which were carried out without a spring element and 8 those in which the novel spring element was employed. The reduction in eccentricity was 50 $\mu$m in the case of $A_1$ max$-B_1$ max, 20 $\mu$m in the case of $A_2$ max$-B_2$ max, and 40 $\mu$m in the case of $A_3$ max$-B_3$ max, corresponding in the case of a standard track width of 300 $\mu$m to a shift from the track center of 16%, 6.7% and 13.4% respectively.

The spring element should advantageously have a spring rate of from 0.2 N/mm to about 1.0 N/mm. However, deviations from this range, which may be due to special characteristics of the drive apparatus and different disk substrate materials, are possible.

We claim:

1. A driving apparatus for a recording disk having a central aperture, particularly a flexible magnetic disk in an envelope, comprising: a driven recessed member; a rotatably mounted clamping member of the type expanding radially in response to the exertion of an axial force thereon; each said member having a clamping surface; means for moving the clamping member toward the recessed member to clamp, at the end of the clamping stroke, the disk upon the introduction of its central aperture between said clamping surfaces; and spring means being interposed between the leading planar surface of said clamping member and the inner bottom of said recessed member such that, prior to the completion of the clamping stroke, by means of said spring means, said clamping member is axially compressed and thus radially expanded against said central aperture to displace said disk toward a centered position and is yieldably coupled to said recessed member to enable said clamping member to be rotatably taken along by said recessed member if said recessed member is rotated prior to the completion of said clamping stroke.

2. A driving apparatus as claimed in claim 1, wherein the spring means is a metal spring, preferably a leaf spring.

3. A driving apparatus as claimed in claim 1 or 2, wherein the spring means is made from a resilient plastics material, particularly a foam plastic.

4. A driving apparatus as claimed in claim 1, wherein the spring means is arranged eccentrically with respect to axis of rotation of the clamping and recessed members.

5. A driving apparatus as claimed in claim 1, 2 or 4, wherein the spring rate of the spring means is from 0.2 N/mm to 1.0 N/mm, preferably about 0.4 N/mm.

* * * * *